(12) United States Patent
Fukuda et al.

(10) Patent No.: US 10,335,679 B2
(45) Date of Patent: Jul. 2, 2019

(54) VIDEO PROCESSING DEVICE, VIDEO PROCESSING METHOD, AND PROGRAM

(71) Applicant: SONY INTERACTIVE ENTERTAINMENT INC., Tokyo (JP)

(72) Inventors: Shizuto Fukuda, Tokyo (JP); Shinji Aizawa, Tokyo (JP); Hisao Wada, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 9 days.

(21) Appl. No.: 15/325,295

(22) PCT Filed: Aug. 27, 2015

(86) PCT No.: PCT/JP2015/074186
§ 371 (c)(1),
(2) Date: Jan. 10, 2017

(87) PCT Pub. No.: WO2016/067734
PCT Pub. Date: May 6, 2016

(65) Prior Publication Data
US 2017/0182415 A1 Jun. 29, 2017

(30) Foreign Application Priority Data
Oct. 27, 2014 (JP) ................. 2014-218505

(51) Int. Cl.
*A63F 13/49* (2014.01)
*A63F 13/497* (2014.01)
(Continued)

(52) U.S. Cl.
CPC ............ *A63F 13/497* (2014.09); *A63F 13/35* (2014.09); *A63F 13/79* (2014.09); *A63F 13/86* (2014.09)

(58) Field of Classification Search
CPC ...................................................... A63F 13/79
See application file for complete search history.

(56) References Cited

U.S. PATENT DOCUMENTS

| 6,699,127 B1 * | 3/2004 | Lobb ...................... A63F 13/10 345/418 |
| 2007/0060389 A1 * | 3/2007 | Shimizu .................. A63F 13/10 463/43 |

(Continued)

FOREIGN PATENT DOCUMENTS

| JP | 2000-157734 A | 6/2000 |
| JP | 2003-320170 A | 11/2003 |

(Continued)

OTHER PUBLICATIONS

International Search Report and Written Opinion dated Nov. 17, 2015, from the corresponding PCT/JP2015/074186.

(Continued)

*Primary Examiner* — Omkar A Deodhar
(74) *Attorney, Agent, or Firm* — Katten Muchin Rosenman LLP

(57) ABSTRACT

Provided are a video processing device, a video processing method, and a program that allow for identification of a portion showing playing details at the time of occurrence of an event from a video showing game playing details on the basis of an event log. A tag data acquisition section (56) acquires logs of events that took place in a game. A material video acquisition section (58) acquires a video showing playing details of the game. An identification section (60) identifies a portion, in the video, showing the game playing details at the times of occurrence of the events represented by the logs.

10 Claims, 11 Drawing Sheets

(51) Int. Cl.
*A63F 13/86* (2014.01)
*A63F 13/79* (2014.01)
*A63F 13/35* (2014.01)

(56) References Cited

U.S. PATENT DOCUMENTS

| | | | |
|---|---|---|---|
| 2009/0118008 A1 | 5/2009 | Kobayashi et al. | |
| 2009/0131177 A1* | 5/2009 | Pearce | A63F 13/10 463/43 |
| 2009/0305790 A1* | 12/2009 | Lu | G06T 15/005 463/42 |
| 2012/0014658 A1 | 1/2012 | Suzuki | |

FOREIGN PATENT DOCUMENTS

| | | |
|---|---|---|
| JP | 2005-319231 A | 11/2005 |
| JP | 2009-112550 A | 5/2009 |
| JP | 2010-214028 A | 9/2010 |
| JP | 2011-72735 A | 4/2011 |

OTHER PUBLICATIONS

International Preliminary Report on Patentability dated May 2, 2017, from the corresponding PCT/JP2015/074186.

\* cited by examiner

FIG. 2

| LOG ID | GAME TITLE DATA | EVENT OCCURRENCE DATE/TIME DATA | EVENT NAME DATA | USED ITEM NAME DATA | RELATED USER NAME DATA |
|---|---|---|---|---|---|
| 0123 | GAME A | 14:55:22 MAY 30, 2014 | Kill | AK-12 | USER A |
| 0124 | GAME A | 14:58:50 MAY 30, 2014 | Kill | AK-12 | USER B |
| 0125 | GAME A | 15:03:20 MAY 30, 2014 | Death | M40 | USER B |
| 0126 | GAME A | 15:08:04 MAY 30, 2014 | Death | M78 | USER C |
| 0127 | GAME A | 15:10:43 MAY 30, 2014 | Kill | P-90 | USER B |
| 0128 | GAME A | 15:11:57 MAY 30, 2014 | Kill | P-90 | USER C |

FIG. 3

| TAG ID | GAME TITLE DATA | EVENT OCCURRENCE DATE/TIME DATA | EVENT NAME DATA | USED ITEM NAME DATA | RELATED USER NAME DATA |
|---|---|---|---|---|---|
| 0124 | GAME A | 14:58:50 MAY 30, 2014 | Kill | AK-12 | USER B |
| 0125 | GAME A | 15:03:20 MAY 30, 2014 | Death | M40 | USER B |
| 0126 | GAME A | 15:08:04 MAY 30, 2014 | Death | M78 | USER C |
| 0127 | GAME A | 15:10:43 MAY 30, 2014 | Kill | P-90 | USER B |
| 0128 | GAME A | 15:11:57 MAY 30, 2014 | Kill | P-90 | USER C |

FIG.5

| VIDEO USED | | |
|---|---|---|
| TITLE | GAME A ▽ | ☐+ ☐- ☐↑ ☐↓ ←F1 |
| PERIOD | CURRENTLY OPEN VIDEO ▽ ←F2 | |

| VIDEO TIME | 3 min ▽ ←F3 |
|---|---|

CHAPTERS USED

1. CHAPTERS WITH 3☆OR MORE ▽   ☐+ ☐- ☐↑ ☐↓ ⎫
2. EVENT: Kill ▽   ☐+ ☐- ☐↑ ☐↓ ⎬ F4
3. EVENT: Death ▽   ☐+ ☐- ☐↑ ☐↓ ⎭

| CREATE WHEN ON STANDBY | ☑ ~Ch1 |
|---|---|
| CREATE WHEN NOT USED | ☑ ~Ch2 |
| AUTO PUBLISH | ☑ ~Ch3 |
| CREATE REGULARLY | ☐ ~Ch4 |

[ EXECUTE ]~Ex        [ CANCEL ]~Ca

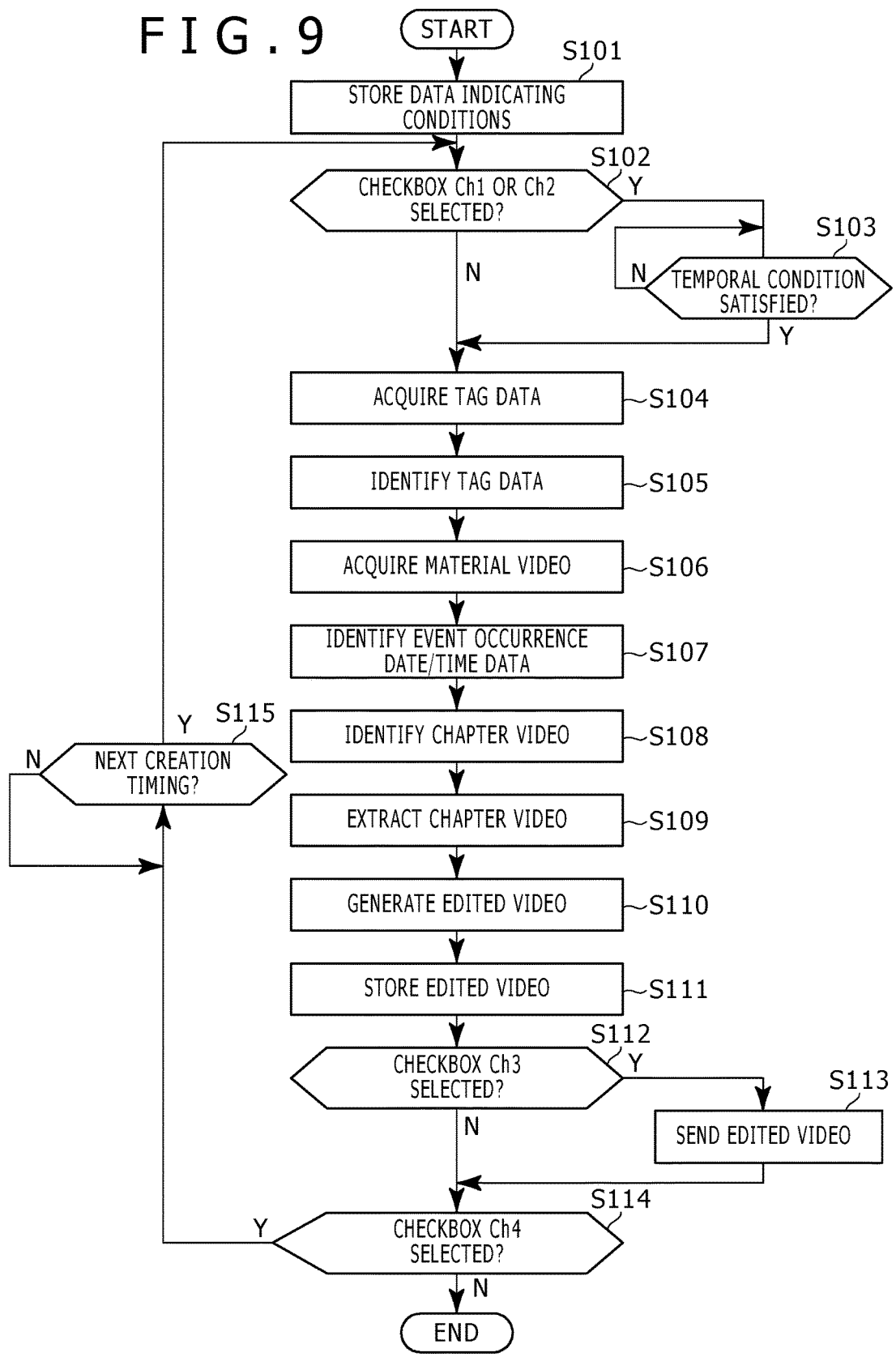

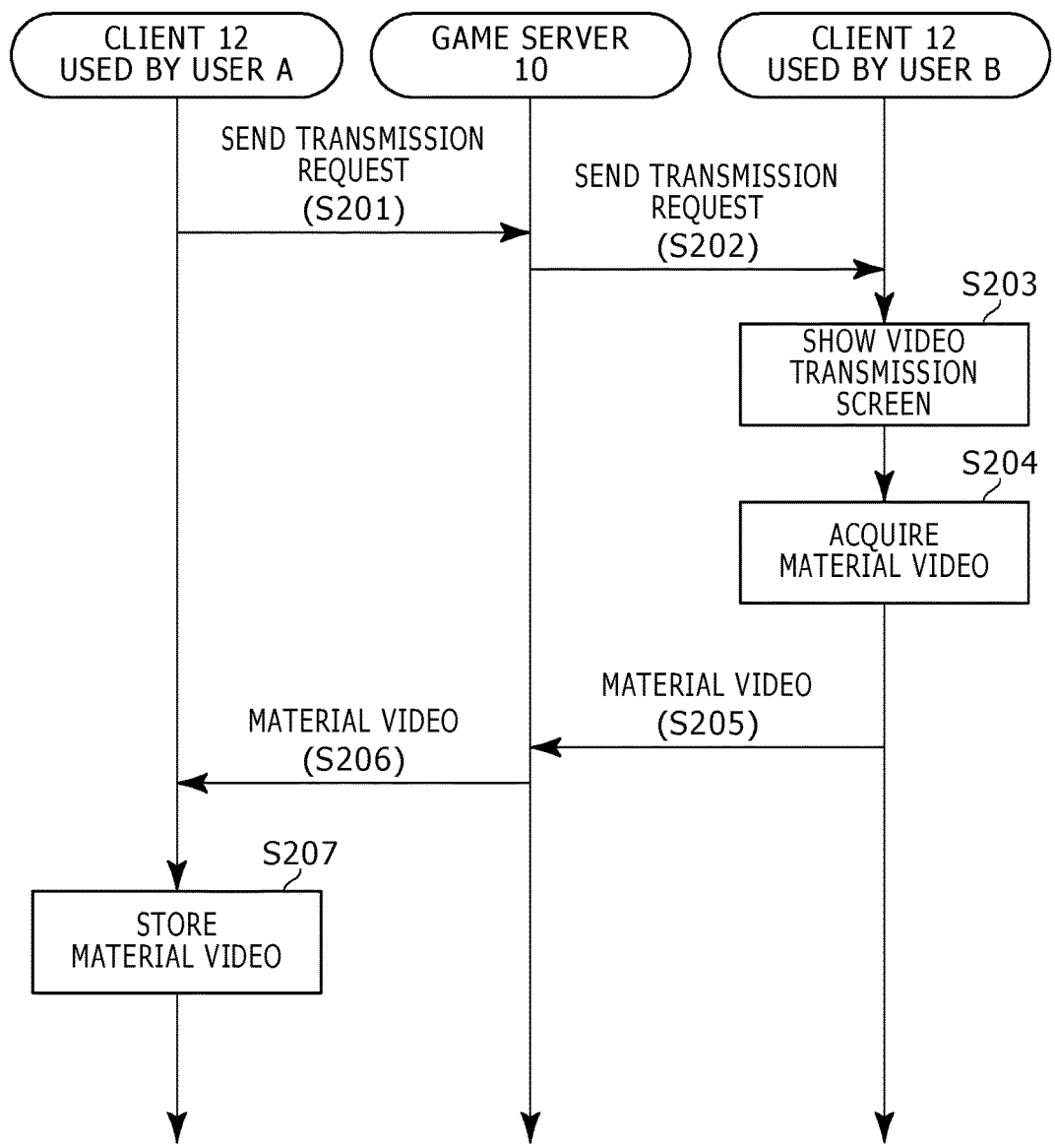

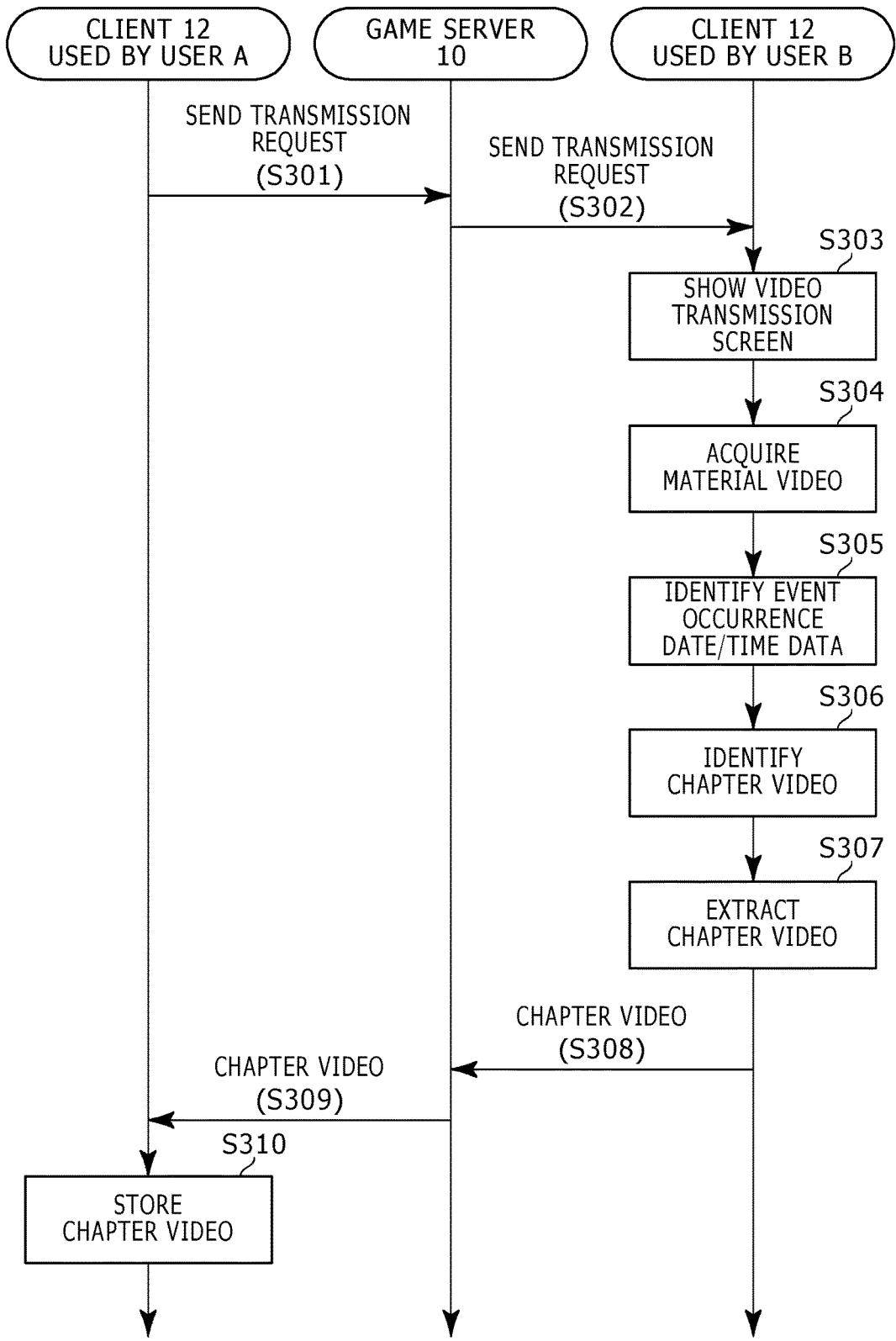

VIDEO PROCESSING DEVICE, VIDEO PROCESSING METHOD, AND PROGRAM

TECHNICAL FIELD

The present invention relates to a video processing device, a video processing method, and a program.

BACKGROUND ART

Technologies are available for capturing still images and videos that show game playing details and storing these images and videos. As an example of such technologies, PTL 1 discloses a technology for storing a game screen image if a given screen shot operation is performed while a game program is under execution.

CITATION LIST

Patent Literature

[PTL 1]
U.S. Patent Application Publication No. 2009/0118008

SUMMARY

Technical Problem

For example, a portion, of a stored video, showing playing details at the time when an event takes place such as clearing a stage or beating a boss character is identified to generate a video to be delivered. However, no technologies have been available to identify a portion showing playing details at the time of occurrence of an event from a video showing game playing details on the basis of an event log. Therefore, it has been necessary for users to play a stored video and search for a portion of interest so as to identify that portion from the video.

The present invention has been devised in light of the foregoing, and it is an object of the present invention to provide a video processing device, a video processing method, a program, and an information storage medium that allow for identification of a portion showing playing details at the time of occurrence of an event from a video showing game playing details on the basis of an event log.

Solution to Problem

In order to solve the above problem, a video processing device according to the present invention includes a log acquisition section, a video acquisition section, and an identification section. The log acquisition section acquires logs of events that took place in a game. The video acquisition section acquires a video showing playing details of the game. The identification section identifies a portion, in the video, showing the game playing details at the times of occurrence of the events represented by the logs.

Further, a video processing method according to the present invention includes a step of acquiring logs of events that took place in a game, a step of acquiring a video showing playing details of the game, and a step of identifying a portion, in the video, showing the game playing details at the times of occurrence of the events represented by the logs.

Still further, a program according to the present invention causes a computer to execute a procedure of acquiring logs of events that took place in a game, a procedure of acquiring a video showing playing details of the game, and a procedure of identifying a portion, in the video, showing the game playing details at the times of occurrence of the events represented by the logs.

Still further, an information storage medium according to the present invention is a computer-readable information storage medium that stores a program. The program causes a computer to execute a procedure of acquiring logs of events that took place in a game, a procedure of acquiring a video showing playing details of the game, and a procedure of identifying a portion, in the video, showing the game playing details at the times of occurrence of the events represented by the logs.

In one mode of the present invention, the video processing device further includes an extraction section that extracts the portion identified by the identification section from the video.

In the present mode, the extraction section may extract the portion identified by the identification section from the video after the end of the game play.

Alternatively, the extraction section may be implemented by a subsystem section that remains active even when the video processing device is on standby, and the portion identified by the identification section may be extracted from the video when the video processing device is on standby.

Further, in another mode of the present invention, the video processing device further includes a video reception section. The video reception section receives, from a device capable of communicating with the video processing device, a video showing playing details of the game on the device.

In the present mode, if the video does not contain any portion that includes the game playing details at the times of occurrence of the events represented by the logs, the video reception section may receive a video including the portion from a device capable of communicating with the video processing device.

Further, in still another mode of the present invention, the identification section identifies, in the video, a portion showing the game playing details at the time of occurrence of the event that satisfies a condition specified by a user.

Further, in still another mode of the present invention, the video processing device further includes a video storage section, a tag data generation section, and an edited video generation section. The video storage section stores a video showing the game playing details. The tag data generation section generates tag data representing the logs about events that took place in the game in a period during which the game playing details are shown by the video. The edited video generation section edits the video stored in the video storage section so as to generate an edited video on the basis of a portion showing the game playing details at the time of occurrence of an event represented by the tag data in the video stored in the video storage section.

BRIEF DESCRIPTION OF DRAWINGS

FIG. 2 is a diagram illustrating an example of event log data.

FIG. 3 is a diagram illustrating an example of tag data.

FIG. 5 is a diagram illustrating an example of a condition setting screen.

FIG. 9 is a flowchart illustrating an example of a processing flow performed by the client according to the embodiment of the present invention.

FIG. 10A is a flowchart illustrating an example of a processing flow performed by the game system according to the embodiment of the present invention.

FIG. 10B is a flowchart illustrating an example of a processing flow performed by the game system according to the embodiment of the present invention.

DESCRIPTION OF EMBODIMENT

A detailed description will be given below of an embodiment of the present invention with reference to the accompanying drawings.

Figure 1:
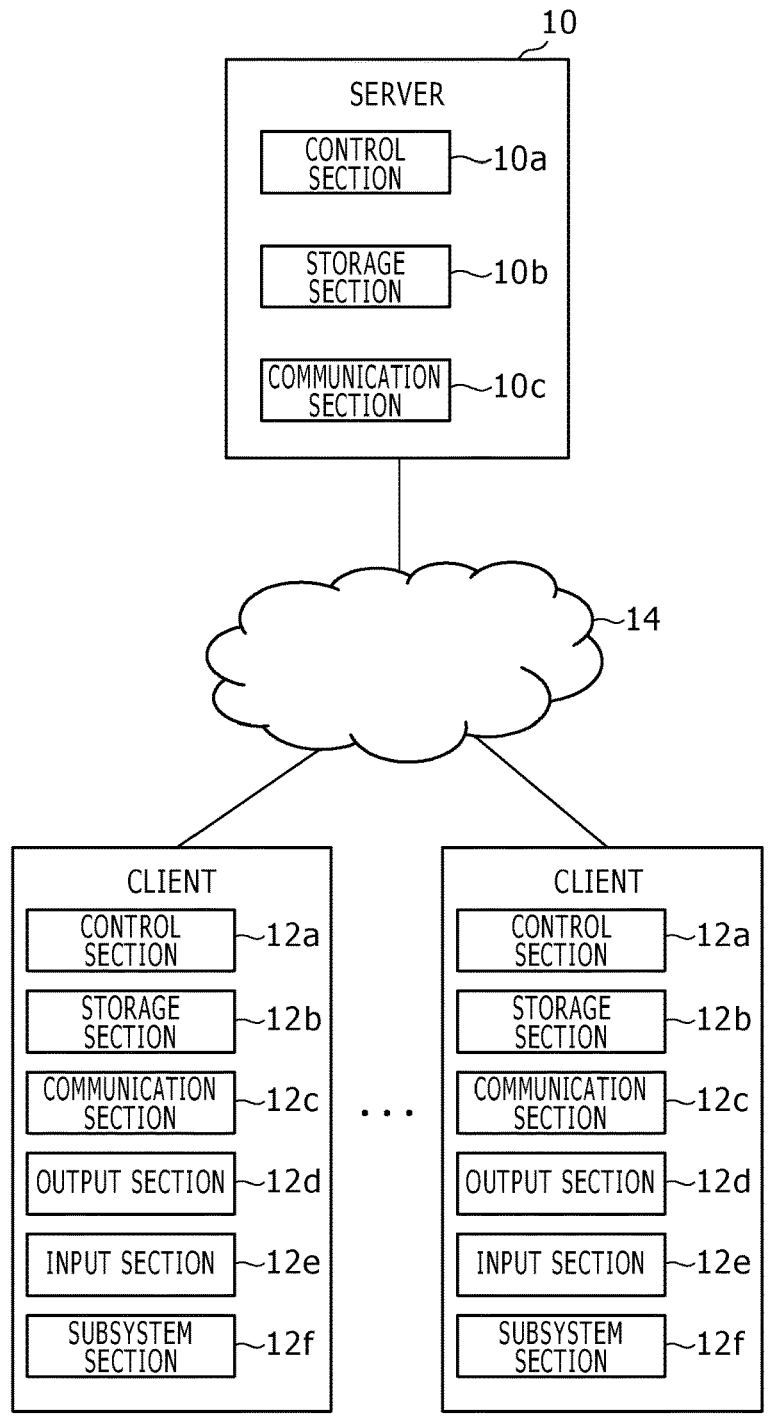
FIG. 1 is a diagram illustrating an example of an overall configuration of a game system according to an embodiment of the present invention.

FIG. 1 is a diagram illustrating an example of an overall configuration of a game system 1 according to an embodiment of the present invention. As illustrated in FIG. 1, the game system 1 according to the present embodiment includes a game server 10 and clients 12 (12-1 to 12-*n*), and in each of these, a computer plays a central role. The game server 10 and the clients 12 are connected to a computer network 14 such as the Internet. Then, the game server 10 and the clients 12 are able to communicate with each other.

The game server 10 is a server computer that executes a game program installed in the game server 10. A plurality of players participate in the game. In the present embodiment, each user participates in the game as a player using the client 12 different from those of other users. The game server 10 includes, for example, a control section 10*a*, a storage section 10*b*, and a communication section 10*c* as illustrated in FIG. 1.

The control section 10*a* is a program-controlled device such as central processing unit (CPU), performing various information processing tasks in accordance with a program stored in the storage section 10*b*.

The storage section 10*b* is, for example, a storage element such as read only memory (ROM) and random access memory (RAM) or a hard disk drive.

The communication section 10*c* is, for example, a communication interface such as network board used to exchange data with the clients 12 via the computer network 14. The game server 10 sends and receives information to and from the clients 12 via the communication section 10*c*.

The clients 12 are computers used by users and, for example, personal computers, game consoles, television receivers, portable gaming devices, or personal digital assistants. In the present embodiment, the program of a game played by users is installed in the clients 12. Then, the users of the clients 12 play the game as its players. Each of the clients 12 includes, for example, a control section 12*a*, a storage section 12*b*, a communication section 12*c*, an output section 12*d*, an input section 12*e*, and a subsystem section 12*f*.

The control section 12*a* is a program-controlled device such as CPU, performing various information processing tasks in accordance with the program stored in the storage section 12*b*. The control section 12*a* according to the present embodiment also includes a graphics processing unit (GPU) that draws images to a frame buffer on the basis of graphics commands and data supplied from the CPU.

The storage section 12*b* is, for example, a storage element such as ROM and RAM or a hard disk drive. The storage section 12*b* stores programs executed by the control section 12*a*. Further, a frame buffer area is reserved within the storage section 12*b* according to the present embodiment for the GPU to draw images.

The communication section 12*c* is, for example, a communication interface used to exchange data with the game server 10 via the computer network 14. Each of the clients 12 sends and receives information to and from the game server 10 and other clients 12 via the communication section 12*c*.

The output section 12*d* is, for example, a display section such as display that shows information in accordance with instructions supplied from the control section 12*a* and an audio output section such as speaker that produces audio outputs.

The input section 12*e* is, for example, a game controller, a touchpad, a mouse, a keyboard, a microphone, and a camera, outputting details of an operation performed by the user to the control section 12*a*.

The subsystem section 12*f* includes a program-controlled device such as CPU provided separately from the control section 12*a* and a storage element provided separately from the storage section 12*b*. The subsystem section 12*f* is provided in each of the clients 12 according to the present embodiment so that the client 12 can continue with various processing tasks such as network processing with low power consumption even when the control section 12*a* and the storage section 12*b* become inactive or go into standby.

The game server 10 according to the present embodiment executes a game program installed in the game server 10. A plurality of players participate in the game. A further description will be given below of how the game system 1 according to the present embodiment operates by taking, as an example, a case in which three users play the game. It should be noted that we assume that the names of the three users are user A, user B, and user C.

In the clients 12 according to the present embodiment, a game program for the client 12 side is installed. This program is associated with the program executed on the game server 10. Then, in the present embodiment, the game program executed on the clients 12 and the game program executed on the game server 10 communicate with each other for coordination, thus allowing the game to be played.

Then, in the present embodiment, the game server 10 manages user identification information such as the names of the users participating in the game as players, identification information of the clients 12 used by the users such as the addresses of the clients 12, and other information. Then, in the present embodiment, identification information of users participating in the game as players and identification information of the clients 12 used by the users are stored in the storage section 10*b* in association with each other. Further, in the present embodiment, information indicating the start and end timings such as the dates and times when the game play began and ended is also stored in the storage section 10*b* of the game server 10.

In the present embodiment, playing images showing playing details of the game are shown on the display of the client 12 at a given frame rate during play of the game in which the user of the client 12 participates as a player. Then, copies of the playing images shown on the display, i.e., copies of the playing images drawn to the frame buffer, are captured and written one after another to a ring buffer area that is provided in the storage section of the client 12 and that can store up to 15 minutes of video.

Here, we assume, for example, that the user performs a given operation such as pressing a given button of the controller. Then, in the present embodiment, the video made up of a series of playing images stored in the ring buffer area is encoded first and then stored in the storage section 12*b* of the client 12 as a video file. This video will be hereinafter referred to as a material video. The material video includes a plurality of frame images. It should be noted that the frame rate at which the series of playing images are shown on the display may be different from or the same as the frame rate of the material video. Further, the resolution at which the series of playing images are shown on the display may be different from or the same as the resolution of the material video. Still further, in the present embodiment, the material video is linked to start and end timings of capture of a playing image that is associated with the material video first before being stored in the storage section 12*b*. Here, we assume, for example, that a material video is linked to the start and end dates and times of capture of a playing image associated with the material video first before being stored in the storage section 12*b*. Hereinafter, the start date and time of capture of a playing image associated with a material video will be referred to as capture start date and time, and the end date and time of capture of a playing image associated with a material video as capture end date and time.

It should be noted that there is no need to store a material video in response to a given operation. For example, a video made up of a series of playing images stored in the ring buffer area may be encoded first and then stored in the storage section 12*b* of the client 12 as a material video file in response to occurrence of a given event in a game and so on. Alternatively, for example, a video made up of all of a series of playing images that appear may be stored as a material video.

Then, in the present embodiment, when a given event takes place during play of the game, event log data associated with the event and illustrated in FIG. 2 is generated and stored in the storage section 10*b* of the game server 10. FIG. 2 is a diagram illustrating an example of event log data according to the present embodiment. As illustrated in FIG. 2, event log data according to the present embodiment includes a log identification (ID), game title data, event occurrence date/time data, event name data, used item name data, and related user name data. The log ID is identification information of the event log data. The game title data indicates the title of the game in which the event associated with the event log data took place. The event occurrence date/time data indicates the date and time when the event associated with the event log data took place. It should be noted that a date and time a given time period before or after the occurrence of the event may be specified as a value of the event occurrence date/time data rather than the actual date and time when the event took place. The event name data indicates the name of the event associated with the event log data. The used item name data indicates the name of the item used in the event associated with the event log data. The related user name data indicates the name of the user related to the event associated with the event log data. FIG. 2 shows six pieces of event log data.

Events stored in the game server 10 as event log data depend, in principle, upon the game played. For example, if a battle game is played, events such as achieving a set number of successive combos or more, beating an opponent, and being beat by an opponent are recorded as event log data. Further, for example, if a racing game is played, events such as moving up or down in standings, going up to first place, end of a lap, end of a final lap, crashing a vehicle, going off course, and colliding with other vehicle are recorded as event log data. Still further, for example, if a puzzle game is played, events such as achieving a set number of chains or more and breaking the highest score are recorded as event log data. Still further, for example, if a sports game is played, events such as scoring a run, goal, point, and so on, making a hole-in-one, hitting a homerun, and fouling a ball off a certain body part are recorded as event log data. Still further, for example, if a role-playing game or an action game is played, events such as achieving a set number of successive combos or more, end of a battle, and significant change in score are recorded as event log data.

Further, in the present embodiment, other events such as generating the above material video, logging in, and logging out are also recorded as event log data.

Then, in the present embodiment, when a material video is stored in the storage section 12*b*, a tag data request is sent to the game server 10. This tag data is linked to the start and end dates and times of the capture that is associated with the material video. Then, the game server 10 generates tag data illustrated in FIG. 3 on the basis of log data about the events that took place from the capture start date and time to the capture end date and time.

As illustrated in FIG. 3, tag data includes a tag ID, game title data, event occurrence date/time data, event name data, used item name data, and related user name data. As illustrated in FIG. 3, the log ID included in event log data is specified as a tag ID included in tag data. Further, the values of the game title data, event occurrence date/time data, and event name data included in event log data are specified respectively as values of the game title data, event occurrence date/time data, and event name data included in tag data. Still further, the values of the used item name data and related user name data included in event log data are specified respectively as values of the used item name data and related user name data included in tag data.

We assume, for example, that the capture start date and time linked to the tag data request sent to the game server 10 is 14:57:32 on May 30, 2014. We also assume that the capture end date and time linked to the tag data request is 15:12:31 on May 30, 2014. In this case, on the basis of five pieces of event log data illustrated in FIG. 2, regarding each of which the date and time when the event took place is later than the capture start date and time but earlier than the capture end date and time, five pieces of tag data illustrated in FIG. 3 that are associated respectively with the five pieces of event log data are generated.

Then, the game server 10 sends the generated tag data to the client 12 that sent the tag data request. Then, the client 12 receives the tag data, storing it in the storage section 12*b*. In the present embodiment, tag data returned from the game server 10 in response to transmission of a tag is linked to the material video before being stored in the storage section 12*b*. The tag data is used to edit material videos, generate videos to be delivered from video delivery sites, and for other purposes.

Figure 4:
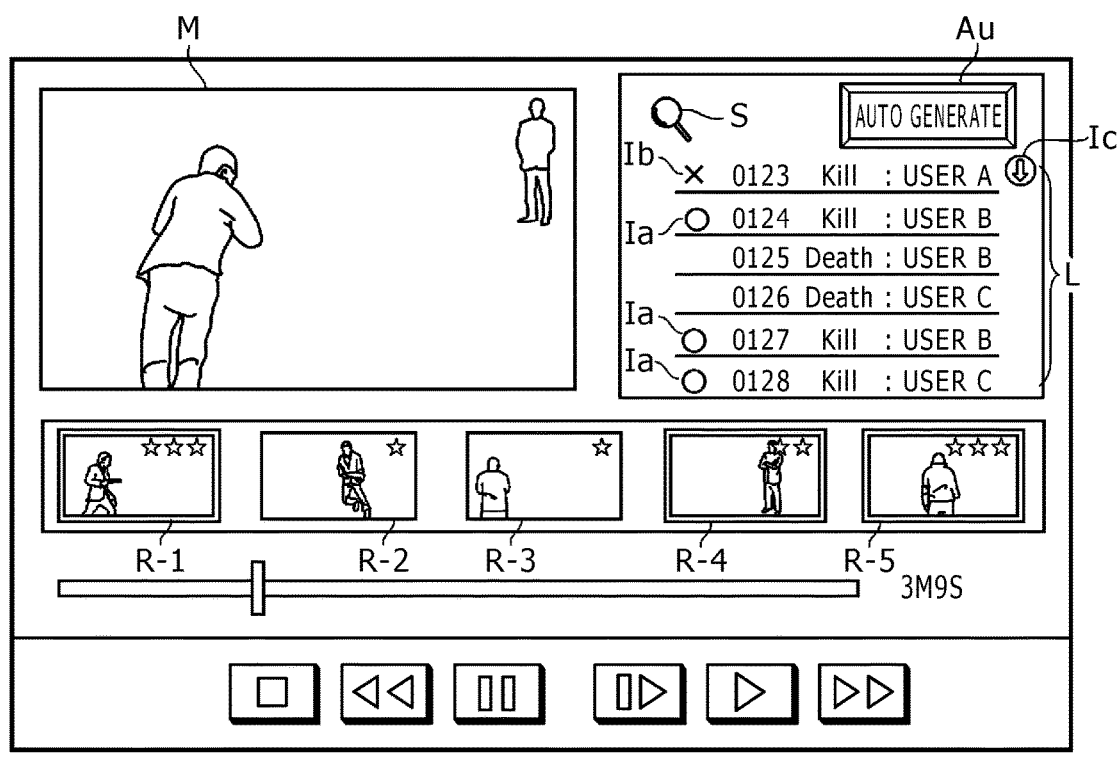
FIG. 4 is a diagram illustrating an example of an editing screen.

FIG. 4 is a diagram illustrating an example of an editing screen for editing a material video according to the present embodiment that appears on the display of the client 12 used by the user A. In the present embodiment, a material video is played by performing a given operation. Here, for example, frame images making up a material video are shown one after another in a video display area M provided in the editing screen.

Further, in the present embodiment, a log area L contains, as a list, information associated with event log data about a game whose playing details are shown by the material video. In the example illustrated in FIG. 4, the log area L contains a log ID, an event name data value, and a related user name data value. These pieces of information will be referred to as log information. Log information is generated based, for example, on event log data returned from the game server 10 to the client 12 in response to an inquiry from the client 12 to the game server 10. In the present embodiment, for example, the log area L contains, as a list, log information associated with event log data about the events that took place from the start date and time of the game play to the end date and time thereof.

Further, in the present embodiment, the editing screen contains, of the frame images making up the material video, that on the date and time indicated by the event occurrence date/time data included in the tag data. Hereinafter, the frame image contained in the editing screen will be referred to as a representative image R. Further, a video which is part of the material video and is made up of frame images of a plurality of successive frames including that of the representative image R will be referred to as a chapter video. A chapter video may be, for example, a video of a given length showing playing details from a given time period before the occurrence of an event to a given time period after the occurrence thereof. Further, the chapter video length may vary depending on the event type and so on. Still further, a portion related to the event may be, for example, identified as a chapter video by an image recognition technique. FIG. 4 contains five representative images (R-1 to R-5). In the present embodiment, when an operation is performed to select the representative image R, a material video is played from the frame associated with the representative image R. Here, for example, a frame image is shown in the video display area M from the frame associated with the representative image R. Further, in the present embodiment, users can specify a rating for chapter videos by performing a given operation. In the example illustrated in FIG. 4, each of the representative images R has a star or stars at the top right corner. In the example illustrated in FIG. 4, the higher the chapter video is rated, the more stars there are in the representative image R associated with the chapter video.

Further, in the present embodiment, when an operation is performed to select a search image S, it is possible to search for the representative images R via a search screen that is not shown. Here, we assume, for example, that a search is made for the representative images R associated with the tag data whose event name data value is "Kill." In the present embodiment, the representative images R found from the search are highlighted. In the example illustrated in FIG. 4, each of the first, fourth, and fifth representative images R-1, R-4, and R-5 found from the search is enclosed with a border. Further, in the present embodiment, log information associated with representative images R, search results, are also highlighted. In the example illustrated in FIG. 4, each piece of the log information associated with the representative images R found from the search has a circle image Ia on the left.

Further, in the present embodiment, the log area L may also contain log information associated with event log data whose date and time of occurrence of the event is before the capture start date and time associated with the material video and after the capture end date and time associated with the material video. In the present embodiment, the log area L contains such log information such that, in a case where a video associated with the log information is received from a device capable of communicating with the client 12, it is possible to specify the video as will be described later. In this case, a message to that effect appears in the log area L. In the example illustrated in FIG. 4, the log information has a cross mark image Ib on the left. The image Ib indicates that there is no representative image R corresponding to the information. Further, in the present embodiment, the other client 12 may store a material video including a portion showing playing details at the time of occurrence of the event associated with the log information that has the cross mark image Ib on the left. In this case, a message to that effect appears in the log area L. In the example illustrated in FIG. 4, the log information has an image Ic on the right. The image Ic indicates that the videos associated with the log information can be acquired.

Thus, in the present embodiment, of the logs of events that took place in a game, those that took place later than the capture start date and time and earlier than the capture end date and time for a material video are extracted as tag data. Then, the tag data is linked to the material video. Thus, the present embodiment allows for a user to readily find a portion showing game playing details at the time of occurrence of an event from within a material video using tag data linked to the material video. Then, in the present embodiment, the user can edit a material video and generate, for example, a video made up of parts cut out from the material video by performing operations via the editing screen illustrated in FIG. 4. Hereinafter, the video generated by editing a material video will be referred to as an edited video. The edited video is, for example, stored in the storage section 12b of the client 12 and uploaded to a video publishing site.

It should be noted that tag data may be acquired from the game server 10 when the client 12 is on standby or when the client 12 is not used such as after the end of game play.

Further, in the present embodiment, when the user (e.g., user A in this case) performs an operation to select an Auto Generate button Au in the editing screen illustrated in FIG. 4, a condition setting screen illustrated in FIG. 5 appears on the display. The present embodiment allows to generate an edited video made up of portions showing game playing details at the times of occurrence of events extracted from a material video in accordance with the settings in the condition setting screen illustrated in FIG. 5.

The condition setting screen illustrated in FIG. 5 contains a form F1 for setting a condition or conditions for game title. In the example illustrated in FIG. 5, a game A is set as a search condition. It should be noted that the form F1 permits to change the number of conditions. Therefore, a plurality of conditions can be set for a game title. In this case, priorities are assigned to the plurality of conditions in the present embodiment.

Further, the condition setting screen illustrated in FIG. 5 contains a form F2 for setting a condition for a time period in which the material video included in the edited video was captured. The form F2 permits to set a time period in which the material video was captured as a search condition. More specifically, a condition such as most recent one month, most recent two months, and most recent one year can be set. Further, only the video open in the editing screen can be set as a search target as illustrated in FIG. 5.

Still further, the condition setting screen illustrated in FIG. 5 contains a form F3 for setting a time length for an edited video generated. In the example illustrated in FIG. 5, three minutes are set as a time length for edited video.

Still further, the condition setting screen illustrated in FIG. 5 contains a form F4 for setting conditions for a chapter video used as an edited video. The form F4 permits to set a condition for each of various attributes with a value specified in tag data. For example, the form F4 permits to set a condition for rating specified in the chapter video and a condition for the date and time of occurrence of an event. Further, the form F4 permits to set a condition for the event name, a condition for an item used in the event and a condition for the user name related to the event. It should be noted that the form F4 permits to change the number of conditions. Therefore, a plurality of conditions can be set for each of various attributes with a value specified in tag data. In this case, priorities are assigned to the plurality of conditions in the present embodiment. In the example illustrated in FIG. 5, three conditions are set. Of the three conditions, "three or more stars" has the highest priority. "Event named Kill" has the next highest priority. "Event named Death" has the lowest priority.

The condition setting screen illustrated in FIG. 5 contains an Execute button Ex and a Cancel button Ca. When the user performs an operation to select the Execute button Ex, an edited video is generated that combines the chapter videos that satisfy the conditions set in the forms F1, F2, and F4 and has the length set in the form F3. Here, for example, a search may be made in the order from the condition with the highest priority until the overall length of the chapter videos that satisfy the conditions exceeds the length set in the form F3. In the example illustrated in FIG. 5, the chapter videos having three or more stars are identified from among the currently open videos whose games are titled "game A." If the overall length of the chapter videos identified in this manner does not exceed three minutes, the chapter videos whose event name is "Kill" are additionally identified from among the remaining videos that are currently open and whose games are titled "game A." If the overall length of the chapter videos identified in this manner does not exceed three minutes, the chapter videos whose event name is "Death" are additionally identified from among the remaining videos that are currently open and whose games are titled "game A." In the present embodiment, the chapter videos identified as described above are combined, thus generating an edited video. Further, in the present embodiment, tag data associated with each of chapter videos included in an edited video is linked to the edited video. The tag data may permit editing by users. Then, in the present embodiment, playing an edited video shows the chapter videos included in the edited video successively one after another on the display.

In the present embodiment, a plurality of material videos may satisfy the conditions set in the forms F1, F2, and F4. In this case, chapter videos identified for each of the plurality of material videos are combined, thus generating edited videos.

Further, in the present embodiment, when the user performs an operation to select the Cancel button Ca, the conditions set in the condition setting screen are cancelled, updating the screen on the display to the editing screen.

Further, the present embodiment permits the user to set an option for generation of an edited video performed in response to the operation to select the Execute button Ex. An option can be set using four checkboxes Ch1 to Ch4 contained in the condition setting screen illustrated in FIG. 5. If the checkbox Ch1 is checked, the generation of an edited video is conducted in a standby state. If the checkbox Ch2 is checked, the generation of an edited video is conducted when the game is not played such as after the end of game play or when the client 12 is not used as when the CPU usage is equal to a given level or less. If the checkbox Ch3 is checked, an edited video is uploaded to a video publishing site after the end of generation of the edited video with no need for user operation. If the checkbox Ch4 is checked, the generation of an edited video that satisfies the set conditions is conducted on a regular basis such as every month. This makes it possible, for example, to regularly update an edited video that is uploaded to a video publishing site to an edited video generated. Further, checking the checkbox Ch4 permits to generate a video (digest video) that satisfies the conditions on a regular basis such as monthly or annually. It should be noted that a digest video may be generated regularly for each game title.

It should be noted that items that can be set in the condition setting screen are not limited to the above. For example, it may be possible to set a condition for game type. Here, for example, if no condition is set for game type, an edited video that combines chapter videos of a variety of game categories is generated. Here, for example, it may be possible to set a particular category as a condition. In this case, an edited video is generated that combines chapter videos of games of that category. Further, it may be possible to set a particular game as a condition as described above. In this case, an edited video is generated that combines chapter videos of that game. Still further, it may be possible to set a condition in relation to the game played most recently. In this case, for example, an edited video is generated from chapter videos of the game played most recently. Further, in this case, an edited video may be generated from chapter videos of a game of the same category as that of the game played most recently.

Still further, it may be possible to set an edited video playing method. For example, it may be possible to set a play speed for an edited video such as normal speed and 10× speed. In this case, an edited video at that play speed is generated. Further, for example, it may be also possible to set whether to perform image processing such as noise insertion. Here, for example, if it is set to perform noise insertion, an edited video with noise is generated. Further, it may be also possible to set how to combine chapter videos. For example, it may be possible to set crossfading for chapter videos. In this case, an edited video is generated that has crossfading at connection points between chapter videos. Still further, it may be also possible to set whether to include a background music (BGM) in an edited video or a song or number as BGM. In this case, an edited video is generated that contains the specified song as BGM.

Further, it may be possible to specify whether to perform processing tasks so as to generate edited videos as those described above with the subsystem section 12*f*. Here, if it is specified that the processing tasks are handled by the subsystem section 12*f*, selection and combination of chapter videos, setting of the play speed, image processing, crossfading, BGM settings, and other tasks described above are performed by the subsystem section 12*f*.

In the present embodiment, the mere setting of conditions by a user allows for extraction of an edited video showing game playing details at the time of occurrence of an event that satisfies the conditions from a material video as described above.

It should be noted that when the generation of an edited video ends, the client 12 may go into standby.

Further, for example, template data indicating the above conditions may be provided from a game manufacturer or dealer to users. Then, an edited video may be generated from a material video on the basis of that template data.

Figure 6:
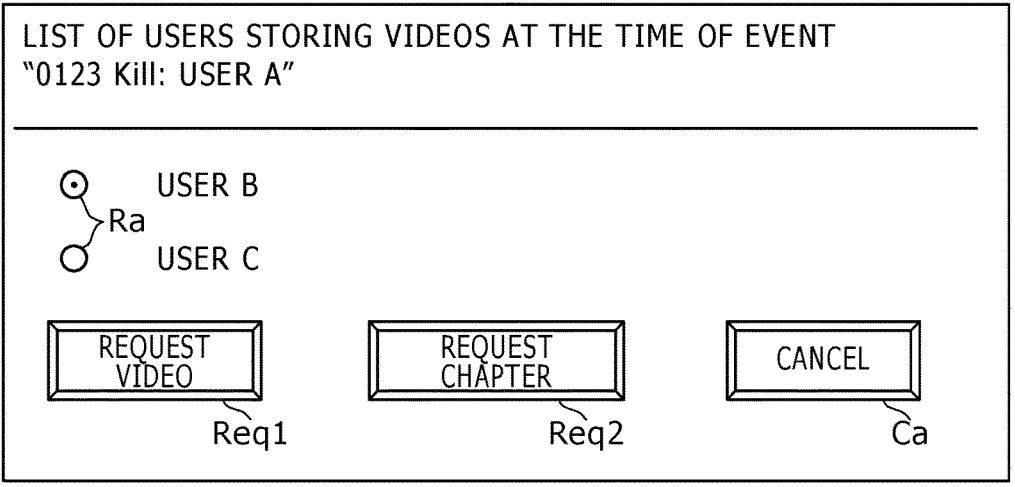
FIG. 6 is a diagram illustrating an example of a video request screen.

Further, in the present embodiment, when the user (e.g., user A in this case) performs an operation to select the image Ic in the editing screen illustrated in FIG. 4, the video request screen illustrated in FIG. 6 appears on the display. In the present embodiment, a material video stored in the client 12 of other user or part thereof can be acquired via the video request screen illustrated in FIG. 6. The video request screen contains, together with radio buttons Ra, user names using the clients 12 that store material videos. The material videos include game playing details at the times of occurrence of the events shown by the log information on the left of the image Ic in the editing screen. In the present embodiment, for example, when the user A performs an operation to select the image Ic in the editing screen illustrated in FIG. 4, the client 12 used by the user A sends, to the game server 10, an inquiry about the user of the client 12 that stores that material video. The date and time of occurrence of the event are, for example, linked to the inquiry. Then, in the present embodiment, the game server 10 identifies the user using the client 12 that is likely to store the material video that includes a portion showing playing details at the time of occurrence of that event. In the present embodiment, when a material video is generated, the game server 10 stores event log data associated with the generation of the material video as described above. This makes it possible for the game server 10 to identify the user on the basis of the event log data. Then, the game server 10 sends the name of the identified user to the client 12. Then, the video request screen illustrated in FIG. 6 is generated on the basis of the returned user name.

Then, we assume that the user A performs an operation to select a user name with the radio button Ra first and then performs another operation to select a material video request button Req1 in the video request screen illustrated in FIG. 6. Here, we assume, for example, that the user B's name is selected. Then, for example, the client 12 used by the user A sends, to the game server 10, a material video transmission request addressed to the client 12 used by the user B. Event log data is linked to the transmission request. The event log data is associated with the log information on the left of the image Ic in the editing screen. The transmission request is sent to the client 12 used by the user B via the game server 10. It should be noted that the transmission request may be sent directly to the client 12 used by the user B without going via the game server 10.

Figure 7A:
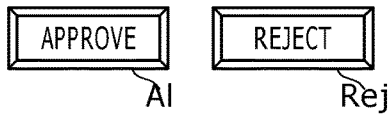
FIG. 7A is a diagram illustrating an example of a video transmission screen.

Then, the video transmission screen illustrated in FIG. 7A appears on the display of the client 12 used by the user B. The video transmission screen illustrated in FIG. 7A contains a checkbox Ch5 for selecting whether to provide a video together with a user ID. We assume here that the user B performs an operation to select an Approve button AI. Then, the client 12 used by the user B sends, to the client 12 of the user A, a material video that includes frame images on the dates and times indicated by the event occurrence date/time data included in the event log data sent. It should be noted that if the checkbox Ch5 is checked at this time, it is shown that the material video sent was provided by the user B. The material video sent may be overlaid with text or a sign such as user ID (identification information) of the user B indicating that the material video was provided by the user B. Alternatively, the material video sent may be overlaid with text or a sign indicating that the video was not shot by the user A. Still alternatively, the material video sent may be overlaid with an icon representing the user B. Still alternatively, identification information of the user B may be linked to the material video sent. The material video is sent to the client 12 used by the user A via the game server 10. It should be noted that the material video may be sent directly to the client 12 used by the user A without going via the game server 10. Then, the client 12 used by the user A receives the material video, storing it in the storage section 12b. On the other hand, if the user B performs an operation to select a Reject button Rej, the material video will not be sent.

Further, we assume that the user A performs an operation to select a user name with the radio button Ra first and then performs another operation to select a chapter video request button Req2. Here, we assume, for example, that the user B's name is selected. Then, a chapter video transmission request is sent to the client 12 used by the user B as when the material video request button Req1 is selected.

Figure 7B:
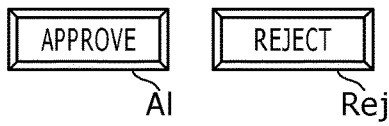
FIG. 7B is a diagram illustrating another example of a video transmission screen.

Then, the video transmission screen illustrated in FIG. 7B appears on the display of the client 12 used by the user B. The video transmission screen illustrated in FIG. 7B also contains the checkbox Ch5 for selecting whether to provide a video together with a user ID. We assume here that the user B performs an operation to select the Approve button AI. Then, the client 12 used by the user B generates a chapter video that includes frame images on the dates and times indicated by the event occurrence date/time data included in the event log data sent on the basis of the material video stored in the client 12 used by the user B. Then, the generated chapter video is sent to the client 12 used by the user A and stored in the storage section 12b of the client 12 as with the transmission of a material video described above. It should be noted that if the checkbox Ch5 is checked at this time, it is shown that the chapter video sent was provided by the user B. The chapter video sent may be overlaid, for example, with text or a sign such as user ID (identification information) of the user B indicating that the material video was provided by the user B. Alternatively, the chapter video sent may be overlaid with text or a sign indicating that the video was not shot by the user A. Still alternatively, the chapter video sent may be overlaid with an icon representing the user B. Still alternatively, identification information of the user B may be linked to the chapter video sent. On the other hand, if the user B performs an operation to select the Reject button Rej, the chapter video will not be sent.

Further, when the user A performs an operation to select a Cancel button Ca, the screen on the display is updated to the editing screen.

Thus, in the present embodiment, a video showing game playing details at the time of occurrence of a user-specified event is sent from the other client 12.

Further, the present embodiment allows for generation of an edited video that combines videos, each showing the state viewed from each of a plurality of players from his or her own perspective, for example, in a first person shooter (FPS) game.

Further, when on standby or when not used such as after the end of game play, the client 12 according to the present embodiment may allow a chapter video to be extracted from a material video as described above. This ensures that a chapter video is extracted without hindering the user from playing the game. Further, when on standby, the client 12 according to the present embodiment may allow a chapter video to be extracted from a material video by the subsystem section 12f. This ensures that a chapter video is extracted with low power consumption without activating the control section 12a or storage section 12b.

Still further, the client 12 according to the present embodiment may, for example, control whether to delete a material video from the storage section 12b on the basis of tag data linked to the material video. For example, a material video linked to tag data that satisfies a given condition may be deleted. For example, a material video linked to tag data that satisfies a given condition such as tag data including a given event, tag data including given used item name data, or tag data including given related user name data, may be deleted. More specifically, for example, a material video not used to generate an edited video and a material video not linked to tag data showing an important or rare event may be deleted.

A further description will be given below of functions implemented in the game system 1 according to the present embodiment and processes performed by the game system 1 according to the present embodiment.

Figure 8A:
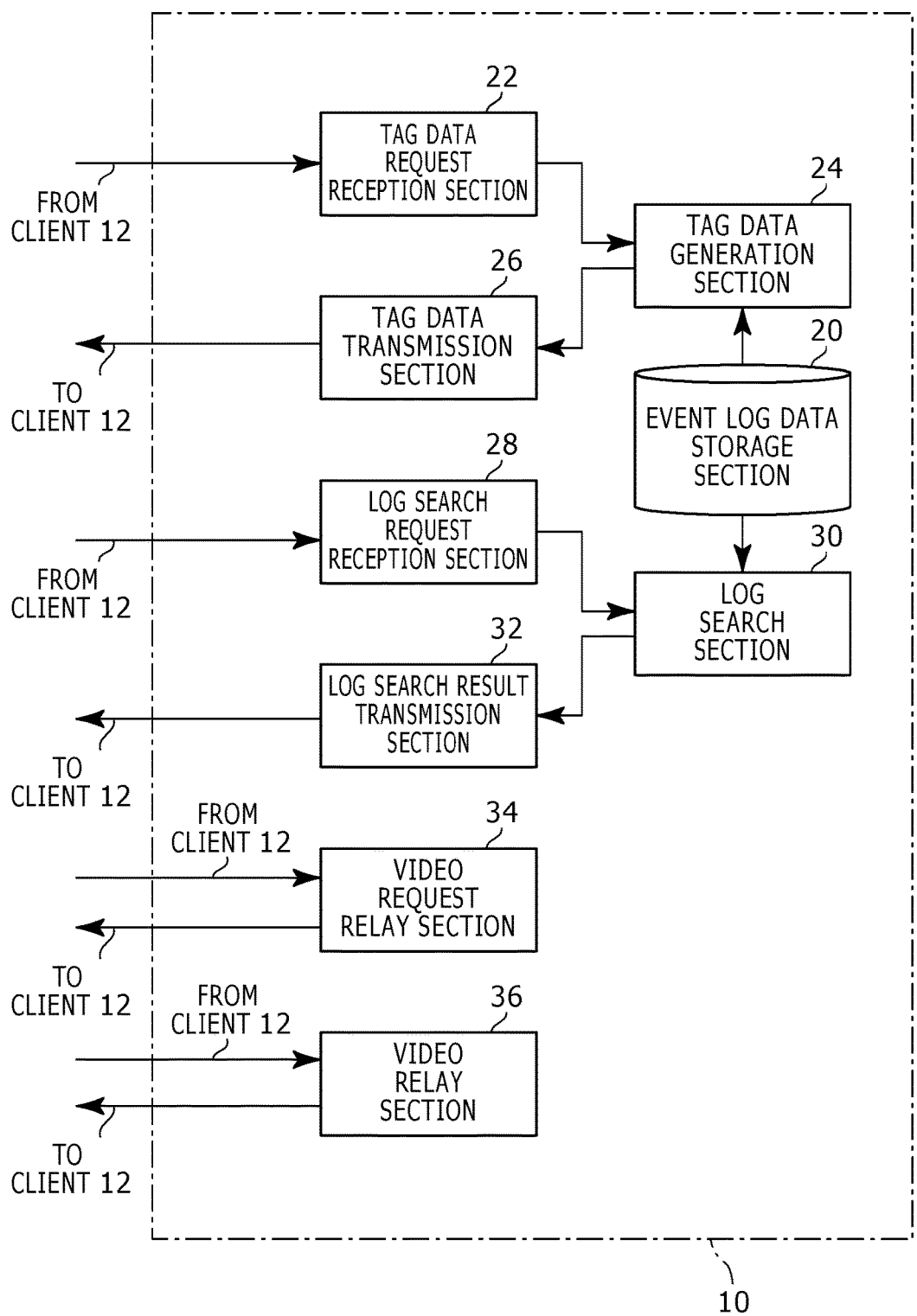
FIG. 8A is a functional block diagram illustrating examples of functions implemented in a game server according to the embodiment of the present invention.

FIG. 8A is a functional block diagram illustrating examples of functions implemented in the game server 10 according to the present embodiment. It should be noted that not all the functions illustrated in FIG. 8A need to be implemented in the game server 10 according to the present embodiment and that functions other than those illustrated in FIG. 8A may be implemented.

As illustrated in FIG. 8A, the game server 10 according to the present embodiment functionally includes, for example, an event log data storage section 20, a tag data request reception section 22, a tag data generation section 24, a tag data transmission section 26, a log search request reception section 28, a log search section 30, a log search result transmission section 32, a video request relay section 34, and a video relay section 36. The event log data storage section 20 is primarily implemented as the storage section 10b. The tag data request reception section 22, the tag data transmission section 26, the log search request reception section 28, the log search result transmission section 32, the video request relay section 34, and the video relay section 36 are primarily implemented as the communication section 10c. The tag data generation section 24 and the log search section 30 are primarily implemented as the control section 10a.

The above functions are implemented as a result of execution of a program by the control section 10a. The program is installed in the game server 10, a computer, and includes instructions that correspond to the above functions. The program is supplied to the game server 10, for example, via a computer-readable information storage medium such as optical disc, magnetic disk, magnetic tape, magneto-optical disk, and flash memory. Alternatively, the program is supplied to the game server 10 via a communication network such as the Internet.

Figure 8B:
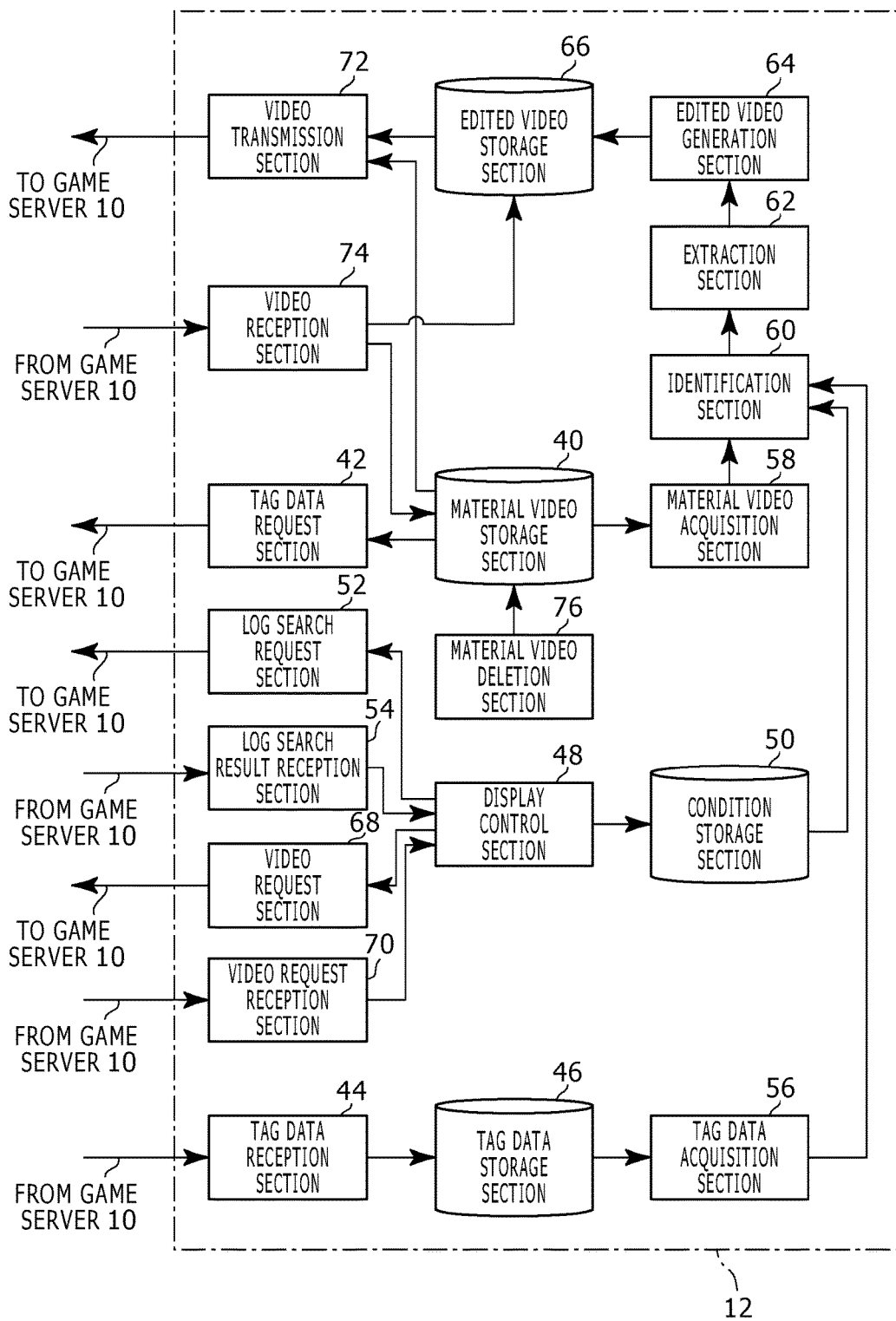
FIG. 8B is a functional block diagram illustrating examples of functions implemented in a client according to the embodiment of the present invention.

FIG. 8B is a functional block diagram illustrating examples of functions implemented in the client 12 according to the present embodiment. It should be noted that not all the functions illustrated in FIG. 8B need to be implemented in the client 12 according to the present embodiment and that functions other than those illustrated in FIG. 8B may be implemented.

As illustrated in FIG. 8B, the client 12 according to the present embodiment functionally includes, for example, a material video storage section 40, a tag data request section 42, a tag data reception section 44, a tag data storage section 46, a display control section 48, a condition storage section 50, a log search request section 52, a log search result reception section 54, a tag data acquisition section 56, a material video acquisition section 58, an identification section 60, an extraction section 62, an edited video generation section 64, an edited video storage section 66, a video request section 68, a video request reception section 70, a video transmission section 72, a video reception section 74, and a material video deletion section 76. The material video storage section 40, the tag data storage section 46, the condition storage section 50, and the edited video storage section 66 are primarily implemented as the storage section 12b. The tag data request section 42, the tag data reception section 44, the log search request section 52, the log search result reception section 54, the video request section 68, the video request reception section 70, the video transmission section 72, and the video reception section 74 are primarily implemented as the communication section 12c. The tag data acquisition section 56, the material video acquisition section 58, the identification section 60, the extraction section 62, the edited video generation section 64, and the material video deletion section 76 are primarily implemented as the control section 12a or the subsystem section 12f. The display control section 48 is primarily implemented as the control section 12a and the output section 12d.

The above functions are implemented as a result of execution of a program by the control section 12a or the subsystem section 12f. The program is installed in the client 12, a computer, and includes instructions that correspond to the above functions. The program is supplied to the client 12, for example, via a computer-readable information storage medium such as optical disc, magnetic disk, magnetic tape, magneto-optical disk, and flash memory. Alternatively, the program is supplied to the client 12 via a communication network such as the Internet.

The event log data storage section 20 stores event log data illustrated in FIG. 2 in the present embodiment.

The tag data request reception section 22 receives a tag data request sent from the client 12 in the present embodiment. The start and end timings of capture of a playing image that is associated with a material video are linked to the tag data request. In the present embodiment, we assume that capture start and end dates and times are linked to the tag data request.

The tag data generation section 24 generates tag data representing logs about events that took place in a game in a period during which game playing details are shown by a video that shows game playing details. The video is stored in the material video storage section 40 which will be described later. In the present embodiment, the tag data generation section 24 generates the tag data illustrated in FIG. 3 on the basis of event log data illustrated in FIG. 2 and the tag data request received by the tag data request reception section 22. In the present embodiment, tag data illustrated in FIG. 3 is generated on the basis of event log data about events that took place in a time period from a capture start date and time linked to a received tag data request to a capture end date and time linked to the tag data request.

In the present embodiment, the tag data transmission section 26 sends tag data, generated by the tag data generation section 24, to the client 12 that sent the tag data request.

In the present embodiment, the log search request reception section 28 receives, from the client 12, a search request for event log data associated with information contained in the log area L in the editing screen.

In the present embodiment, the log search section 30 searches, in response to reception of a search request, event log data stored in the event log data storage section 20 for event log data associated with information contained in the log area L in the editing screen.

In the present embodiment, the log search result transmission section 32 sends, to the client 12 that sent the event log data search request, the event log data that was searched for.

In the present embodiment, the video request relay section 34 relays a video transmission request sent by the client 12. When a video transmission request addressed to the client 12 of the user B is received from the client 12 of the user A, the video request relay section 34 sends the transmission request to the client 12 of the user B.

In the present embodiment, the video relay section 36 relays a video such as material video and chapter video sent from the client 12. When a video addressed to the client 12 of the user A is received from the client 12 of the user B, for example, the video relay section 36 sends the video to the client 12 of the user A.

In the present embodiment, the material video storage section 40 stores a material video described above. In the present embodiment, capture start and end timings of a playing image that is associated with the material video are linked to the material video as described above. For example, capture start and end dates and times are linked to the material video.

In the present embodiment, the tag data request section 42 sends, to the game server 10, a tag data request linked to the capture start and end dates and times that are linked to the material video stored in the material video storage section 40.

In the present embodiment, the tag data reception section 44 receives tag data sent by the tag data transmission section 26 of the game server 10 in response to the tag data request sent from the tag data request section 42.

In the present embodiment, the tag data storage section 46 stores the tag data received by the tag data reception section 44.

In the present embodiment, the display control section 48 generates the editing screen illustrated in FIG. 4, the search screen that appears when an operation is performed to select the search image S, and the condition setting screen illustrated in FIG. 5.

Further, as described above, the display control section 48 inquires the game server 10 about the user names contained in the video request screen when an operation is performed to select the example Ic contained in the editing screen illustrated in FIG. 4. Then, the display control section 48 generates the video request screen illustrated in FIG. 6 on the basis of the user names returned from the game server 10 as described above.

Further, the display control section 48 generates the video transmission screen illustrated in FIG. 7A in response to reception of a material video transmission request. Still further, the display control section 48 generates the video transmission screen illustrated in FIG. 7B in response to reception of a chapter video transmission request.

Then, in the present embodiment, the display control section 48 shows the screens generated as described above on the display.

Further, in the present embodiment, the display control section 48 generates, during play of a game, playing images showing playing details of the game at a given frame rate, showing the images on the display.

Still further, in the present embodiment, when an operation is performed to select the Execute button Ex in the condition setting screen illustrated in FIG. 5, the display control section 48 stores data indicating the conditions set in the condition setting screen in the condition storage section 50.

In the present embodiment, the condition storage section 50 stores data indicating the conditions set in the condition setting screen illustrated in FIG. 5.

In the present embodiment, the log search request section 52 sends, to the game server 10, an event log data search request associated with information contained in the log area L when the editing screen appears.

In the present embodiment, the log search result reception section 54 receives event log data sent by the game server 10 in response to an event log data search request. The display control section 48 generates information contained in the log area L in the editing screen on the basis of the event log data.

In the present embodiment, the tag data acquisition section 56 acquires logs of events that took place in a game. In the present embodiment, the tag data acquisition section 56 acquires tag data stored in the tag data storage section 46 as logs of events that took place in the game.

In the present embodiment, the material video acquisition section 58 acquires a video showing playing details of a game. In the present embodiment, the material video acquisition section 58 acquires, for example, a material video stored in the material video storage section 40.

In the present embodiment, the identification section 60 identifies a portion, in a material video, showing the game playing details at the times of occurrence of the events represented by the logs of events that took place in the game. This portion corresponds, for example, to the representative image R and a chapter video in the present embodiment. The identification section 60 identifies, for example, event occurrence date/time data included in the tag data acquired by the tag data acquisition section 56 in the present embodiment. Then, the identification section 60 identifies, in the material video acquired by the material video acquisition section 58, the frame image that appeared on the display on the identified date and time indicated by the event occurrence date/time data. In the present embodiment, capture start and end dates and times are linked to a material video. This permits to identify the frame image that appeared on that date and time on the basis of the date and time indicated by the event occurrence date/time data.

Further, the identification section 60 identifies a portion, in a material video, showing game playing details at the time of occurrence of an event that satisfies the condition specified by the user. For example, if a search is made for the representative images R associated with the tag data whose event name data value is "Kill" via the search screen described above, the identification section 60 identifies the event occurrence date/time data included in the tag data whose event name data value is "Kill." Then, the identification section 60 identifies, in the material video, the frame image that appeared on the date and time indicated by the identified event occurrence date/time data.

Still further, for example, when the user performs an operation to select the Execute button Ex arranged in the condition setting screen illustrated in FIG. 5, the identification section 60 identifies the tag data that satisfies the conditions set in the forms F1, F2, and F4. Then, the identification section 60 identifies the event occurrence date/time data included in the identified tag data. Then, the identification section 60 identifies, in the material video, the frame image that appeared on the date and time indicated by the identified event occurrence date/time data. Here, the identified frame image is, for example, each of the representative images R contained in the editing screen illustrated in FIG. 4.

Still further, in the present embodiment, the identification section 60 also identifies a chapter video made up of frame images of a plurality of successive frames including the frame of the identified frame image.

In the present embodiment, the extraction section 62 extracts the portion identified by the identification section 60 from the material video. The extraction section 62 extracts, for example, the chapter video identified by the identification section 60 from the material video. The extraction section 62 may extract the portion identified by the identification section 60 after the end of the game play from the material video. Further, the extraction section 62 may be implemented by the subsystem section 12f that remains active even when the client 12 is on standby. Then, the extraction section 62 may extract the portion identified by the identification section 60 when the client 12 is on standby from the material video. Still further, the extraction section 62 may extract the portion identified by the identification section 60 when the client 12 is not used from the material video.

In the present embodiment, the edited video generation section 64 generates an edited video on the basis of a material video stored in the material video storage section 40. For example, the edited video generation section 64 combines chapter videos extracted by the extraction section 62, thus generating an edited video. The edited video generation section 64 generates, for example, an edited video in accordance with user operations performed via the editing screen illustrated in FIG. 4. Further, in the present embodiment, the edited video generation section 64 generates an edited video that combines the chapter videos extracted in accordance with the conditions set in the condition setting screen illustrated in FIG. 5. When an edited video is generated, the edited video generation section 64 stores that edited video in the edited video storage section 66. Thus, in the present embodiment, the edited video generation section 64 generates an edited video on the basis of the portion, in the video stored in the material video storage section 40, showing game playing details at the time of occurrence of the event represented by the tag data.

In the present embodiment, the edited video storage section 66 stores the edited video generated by the edited video generation section 64.

In the present embodiment, the video request section 68 sends a video transmission request addressed to the client 12 for requesting transmission of a video. Although the video request section 68 sends a transmission request to the game server 10 in the present embodiment, a transmission request may be sent directly to the client 12 for requesting transmission of the video without going via the game server 10. In the present embodiment, when an operation is performed to select the material video request button Req1 in the video request screen illustrated in FIG. 6, a material video transmission request is sent that is addressed to the client 12 of the user whose name is selected with the radio button Ra. Further, in the present embodiment, when an operation is performed to select the chapter video request button Req2 in the video request screen illustrated in FIG. 6, a chapter video transmission request is sent that is addressed to the client 12 of the user whose name is selected with the radio button Ra.

In the present embodiment, the video request reception section 70 receives a video transmission request sent from the video request section 68 of the other client 12.

In the present embodiment, the video transmission section 72 sends a video addressed to the client 12 that sent the video transmission request. It should be noted that the video transmission section 72 also handles transmission of edited videos to video publishing sites in the present embodiment.

In the present embodiment, the video reception section 74 receives a video sent from the video transmission section 72 of the other client 12. In the example described above, the video reception section 74 of the client 12 used by the user A receives, from the client 12 used by the user B capable of communicating with the client 12 used by the user A, a video showing playing details of the game on the client 12 used by the user B. Further, if no portion is included that includes game playing details at the time of occurrence of the event represented by the tag data acquired by the tag data acquisition section 56, the video reception section 74 may receive a video including that portion from the other client 12.

In the present embodiment, the material video deletion section 76 deletes the material video linked to the tag data that satisfies a given condition as described above.

It should be noted that the transmission and reception of videos may be conducted via the game server 10 or directly between the clients 12.

A description will be given here of an example of a processing flow performed by the client 12 according to the present embodiment when an operation is performed to select the Execute button Ex in the condition setting screen illustrated in FIG. 5 with reference to the flowchart illustrated in FIG. 9.

First, the display control section 48 stores, in the condition storage section 50, data indicating the conditions set in the condition setting screen illustrated in FIG. 5 (S101). The data indicating the conditions also includes data indicating whether the checkboxes Ch1 to Ch4 are selected in the condition setting screen illustrated in FIG. 5.

Then, the identification section 60 confirms whether data indicating that the checkbox Ch1 or Ch2 has been selected is stored in the condition storage section 50 (S102). If so confirmed (Y in S102), the client 12 waits until the temporal condition for the selected checkbox Ch1 or Ch2 is satisfied (S103). Here, for example, if both the checkboxes Ch1 and Ch2 are selected, the client 12 waits until it goes into standby or becomes unused in the process illustrated in S103. Further, for example, if the checkbox Ch1 is selected, the client 12 waits until it goes into standby in the process illustrated in S103. Still further, for example, if the checkbox Ch2 is selected, the client 12 waits until it becomes unused in the process illustrated in S103.

Then, if it is confirmed in S102 that the above data is not stored in the condition storage section 50 (N in S102), or if the process illustrated in S103 is terminated, the tag data acquisition section 56 acquires tag data stored in the tag data storage section 46 (S104). Then, the identification section 60 identifies, in the tag data acquired in the process illustrated in S104, the tag data that satisfies the conditions indicated by the data stored in the process illustrated in S101 in the condition storage section 50 (S105). Then, of the material videos stored in the material video storage section 40, the material video acquisition section 58 acquires material videos linked to the tag data identified in the process illustrated in S105 (S106).

Then, the identification section 60 identifies the event occurrence date/time data included in the tag data identified in the process illustrated in S105 (S107). Then, the identification section 60 identifies, in the material videos acquired in the process illustrated in S106, the chapter videos that include the frame images that appeared on the dates and times indicated by the event occurrence date/time data identified in the process illustrated in S107 (S108). Then, the extraction section 62 extracts the chapter videos, identified in the process illustrated in S108, from the material videos (S109). Then, the edited video generation section 64 generates an edited video that combines the chapter videos extracted in the process illustrated in S109 (S110). Then, the edited video generation section 64 stores the edited video, generated in the process illustrated in S110, in the edited video storage section 66 (S111).

Then, the identification section 60 confirms whether data indicating that the checkbox Ch3 has been selected is stored in the condition storage section 50 (S112). If confirmed otherwise (N in S112), the processes in the present processing example are terminated. If so confirmed (Y in S112), the video transmission section 72 sends the edited video, stored in the process illustrated in S111 as described above, to a video publishing site (S113).

Then, the identification section 60 confirms whether data indicating that the checkbox Ch4 has been selected is stored in the condition storage section 50 (S114). If confirmed otherwise (N in S114), the processes in the present processing example are terminated. If so confirmed (Y in S114), the client 12 waits until the predetermined next timing for creation comes along (S115). For example, the client 12 waits until one month elapses after the execution of the edited video generation process. Then, when the next timing for creation comes along, the processes from S102 onward will be performed again.

It should be noted that the sequence for performing the processes in the above processing example is not limited to that described above. For example, some or all of the processes illustrated in S104 to S109 may be performed prior to the process illustrated in S102.

A description will be given next of an example of a processing flow performed by the game system 1 according to the present embodiment when an operation is performed to select the material video request button Req1 in the video request screen illustrated in FIG. 6 with reference to the flowchart illustrated in FIG. 10A. We assume here that the user A performs an operation to select the user B's name with the radio button Ra first and then performs another operation to select the material video request button Req1.

First, the video request section 68 of the client 12 used by the user A sends, to the game server 10, a material video transmission request addressed to the client 12 used by the user B. Then, the video request relay section 34 of the game server 10 receives the transmission request (S201). The event log data associated with the log information contained on the left of the image Ic in the editing screen is linked to the transmission request as described above. Then, the video request relay section 34 of the game server 10 sends the transmission request to the client 12 used by the user B. Then, the video request reception section 70 of the client 12 used by the user B accepts the transmission request (S202). Then, the display control section 48 of the client 12 used by the user B shows the video transmission screen illustrated in FIG. 7A on the display (S203).

We assume here that the user B performs an operation to select the Approve button AI. Then, the material video acquisition section 58 of the client 12 used by the user B acquires, from the material video storage section 40, the material video that includes frame images on the dates and times indicated by the event occurrence date/time data included in the event log data sent (S204). Then, the video transmission section 72 of the client 12 used by the user B sends the material video addressed to the client 12 used by the user A and acquired in the process illustrated in S204. Then, the video relay section 36 of the game server 10 receives the material video (S205). Then, the video relay section 36 of the game server 10 sends the material video to the client 12 of the game A. Then, the video reception section 74 of the client 12 of the game A receives the material video (S206). Then, the video reception section 74 of the client 12 of the game A stores the material video, received in the process illustrated in S206, in the material video storage section 40, terminating the processes illustrated in the present processing example.

It should be noted that we assume that the user B performs an operation to select the Reject button Rej after the end of the process illustrated in S203 in the present processing example illustrated in FIG. 10A. Then, the video transmission section 72 of the client 12 used by the user B sends, to the game server 10, information addressed to the client 12 used by the user A indicating the rejection of the material video transmission request. Then, the video relay section 36 of the game server 10 receives that information. Then, the video relay section 36 of the game server 10 sends that information to the client 12 used by the user A. Then, the display control section 48 of the client 12 used by the user A shows that information on the display.

Further, in the present processing example illustrated in FIG. 10A, there is a likelihood that the requested material video may have already been deleted from the material video storage section 40 of the client 12 used by the user B. In this case, the processes from S203 onward will not be performed. Instead, the video transmission section 72 of the client 12 used by the user B sends, to the game server 10, information addressed to the client 12 used by the user A indicating the rejection of the material video transmission request on the grounds that the material video has been deleted. Then, the video relay section 36 of the game server 10 receives that information. Then, the video relay section 36 of the game server 10 sends that information to the client 12 used by the user A. Then, the display control section 48 of the client 12 used by the user A shows that information on the display.

Still further, in the present processing example illustrated in FIG. 10A, we assume that the user B checks the checkbox Ch5 first and then performs an operation to select the Approve button AI in the video transmission screen illustrated in FIG. 7A. In this case, it is shown as described above that the material video sent was provided by the user B.

A description will be given next of an example of a processing flow performed by the game system 1 according to the present embodiment when an operation is performed to select the chapter video request button Req2 in the video request screen illustrated in FIG. 6 with reference to the flowchart illustrated in FIG. 10B. We assume here that the user A performs an operation to select the user B's name with the radio button Ra first and then performs another operation to select the chapter video request button Req2.

First, the video request section 68 of the client 12 used by the user A sends, to the game server 10, a chapter video transmission request addressed to the client 12 used by the user B. Then, the video request relay section 34 of the game server 10 receives the transmission request (S301). The event log data associated with the log information contained on the left of the image Ic in the editing screen is linked to the transmission request as described above. Then, the video request relay section 34 of the game server 10 sends the transmission request to the client 12 used by the user B. Then, the video request reception section 70 of the client 12 used by the user B accepts the transmission request (S302). Then, the display control section 48 of the client 12 used by the user B shows the video transmission screen illustrated in FIG. 7B on the display (S303).

We assume here that the user B performs an operation to select the Approve button AI. Then, the material video acquisition section 58 of the client 12 used by the user B acquires, from the material video storage section 40, the material video that includes frame images on the dates and times indicated by the event occurrence date/time data included in the event log data sent (S304). Then, the identification section 60 of the client 12 used by the user B identifies the event occurrence date/time data included in the event log data sent (S305). Then, the identification section 60 of the client 12 used by the user B identifies, in the material video acquired in the process illustrated in S304, the chapter video that includes the frame images that appeared on the dates and times indicated by the event occurrence date/time data identified in the process illustrated in S305 (S306). Then, the extraction section 62 of the client 12 used by the user B extracts the chapter video identified in the process illustrated in S306 from the material video acquired in the process illustrated in S304 (S307). Then, the video transmission section 72 of the client 12 used by the user B sends the chapter video addressed to the client 12 used by the user A and acquired in the process illustrated in S307. Then, the video relay section 36 of the game server 10 receives the chapter video (S308). Then, the video relay section 36 of the game server 10 sends the chapter video to the client 12 of the game A. Then, the video reception section 74 of the client 12 of the game A receives the chapter video (S309). Then, the video reception section 74 of the client 12 of the game A stores the chapter video, received in the process illustrated in S309, in the edited video storage section 66 (S310), terminating the processes illustrated in the present processing example.

It should be noted that we assume that the user B performs an operation to select the Reject button Rej after the process illustrated in S303 in the processing example illustrated in FIG. 10B. Then, the video transmission section 72 of the client 12 used by the user B sends, to the game server 10, information addressed to the client 12 used by the user A indicating the rejection of the chapter video transmission request. Then, the video relay section 36 of the game server 10 receives that information. Then, the video relay section 36 of the game server 10 sends that information to the client 12 used by the user A. Then, the display control section 48 of the client 12 used by the user A shows that information on the display.

Further, in the present processing example illustrated in FIG. 10B, there is a likelihood that the material video that includes the requested chapter video may have already been deleted from the material video storage section 40 of the client 12 used by the user B. In this case, the processes from S203 onward will not be performed. Instead, the video transmission section 72 of the client 12 used by the user B sends, to the game server 10, information addressed to the client 12 used by the user A indicating the rejection of the material video transmission request on the grounds that the material video has been deleted. Then, the video relay section 36 of the game server 10 receives that information. Then, the video relay section 36 of the game server 10 sends that information to the client 12 used by the user A. Then, the display control section 48 of the client 12 used by the user A shows that information on the display.

Still further, in the present processing example illustrated in FIG. 10B, we assume that the user B checks the checkbox Ch5 first and then performs an operation to select the Approve button AI in the video transmission screen illustrated in FIG. 7B. In this case, it is shown as described above that the chapter video sent was provided by the user B.

It should be noted that there is no need to make video transmission requests and send and receive videos via the game server 10 and that these tasks may be conducted directly between the clients 12.

Further, it is acceptable not to send the video immediately after an operation performed by the user B to select the Approve button AI in the video transmission screen illustrated in FIG. 7A or 7B. For example, when the client 12 used by the user B is on standby or when it is not used, a video may be sent or a chapter video may be generated. In this case, there is a likelihood that the user B may delete a material video after performing an operation to select the Approve button AI and before the material or chapter video is sent. In this case, for example, a screen may appear on the display of the client 12 used by the user B for selecting whether to cancel the transmission of the video to the user A. Then, in this case, if the user B chooses to cancel the transmission of the video, the material video may be deleted. On the other hand, if the user B chooses not to cancel the transmission of the video, it is acceptable not to delete the material video.

It should be noted that the present invention is not limited to the embodiment described above.

For example, event log data appropriate to an operation performed on the controller such as pressing a given button may be generated in response to that operation. Further, for example, event log data appropriate to an audio input to the microphone may be generated in response to that audio. Still further, for example, when a given facial expression (e.g., smiling face) is detected by the camera, event log data appropriate to that expression may be generated. This makes it possible for the user to readily extract a portion showing playing details from an edited video at a desired timing during play of a game by pressing a given button, inputting a given audio, or making a given facial expression at that timing. Further, this makes it possible to generate an edited video that includes a portion showing playing details of the game at that timing.

For example, sharing of roles between the game server 10 and the clients 12 is not limited to the above. For example, tag data generation may be handled by the clients 12 rather than by the game server 10. Still further, for example, event log data may be stored in the clients 12 rather than in the game server 10.

Still further, the present embodiment may be applied to games in which a single user participates as a player rather than games in which a plurality of users participate as players. Then, for example, the clients 12 may additionally play the roles played by the game server 10 in the above description.

Still further, the game server 10 may include a plurality of housings. Still further, each of the clients 12 may include a plurality of housings.

The above specific character strings and those in the drawings are illustrative, and the present invention is not limited thereto.

The invention claimed is:

1. A video processing device comprising:
   a log acquisition section adapted to acquire a log of events that took place in a game,
   wherein a moving image of the game is continuously recorded using a ring buffer having a predetermined storage capacity, and
   wherein the events are selected from a list of predefined events for the game;
   a video acquisition section adapted to acquire from the ring buffer, a video showing playing details of the game; and an identification section adapted to identify a portion, in the video, showing the game playing details at times of occurrence of the events in the log; and a memory to store the video in association with the events in the log.

2. The video processing device of claim 1, further comprising:

an extraction section adapted to extract the portion identified by the identification section from the video, wherein the portion is stored in the memory as a new video separate from the video.

3. The video processing device of claim 2, wherein the extraction section extracts the portion identified by the identification section from the video after the end of the game play.

4. The video processing device of claim 2, wherein the extraction section is implemented by a subsystem section that remains active even when the video processing device is on standby, and the portion identified by the identification section is extracted from the video when the video processing device is on standby.

5. The video processing device of claim 1, further comprising:

a video reception section adapted to receive, from a device capable of communicating with the video processing device, a video showing playing details of the game on the device.

6. The video processing device of claim 5, wherein if the video does not contain any portion that includes the game playing details at the times of occurrence of the events represented by the log, the video reception section receives a video including the portion from a device capable of communicating with the video processing device.

7. The video processing device of claim 1, wherein the identification section identifies, in the video, a portion showing the game playing details at the time of occurrence of the event that satisfies a condition specified by a user.

8. The video processing device of claim 1, further comprising:

a tag data generation section adapted to generate tag data representing the events that took place in the game in a period during which the game playing details are shown by the video; and an edited video generation section adapted to edit the video stored in the memory so as to generate an edited video only including the events that took place in the game.

9. A video processing method comprising:

continuously recording a moving image of a game in a ring buffer, wherein the ring buffer has a predetermined storage capacity;

acquiring a logs of events that took place in the game, wherein the events are selected from a list of predefined events in the game;

acquiring, from the ring buffer, a video showing playing details of the game; and identifying a portion, in the video, showing the game playing details at the times of occurrence of the events represented by the log, and storing the video in a memory in association with the events in the log.

10. A non-transitory computer readable medium having stored thereon a program for a computer, the program comprising:

by a log acquisition section, acquiring a log of events that took place in a game, wherein a moving image of the game continuously recorded using a ring buffer having a predetermined storage capacity, and wherein the events are selected from a list of predefined events for the game;

by a video acquisition section, acquiring a video, from the ring buffer, showing playing details of the game; and by an identification section, identifying a portion, in the video, showing the game playing details at the times of occurrence of the events represented by the log; and a memory to store the video in association with the events in the log.

* * * * *